E. C. OVERBOE.
SPRING WHEEL.
APPLICATION FILED JAN. 6, 1922.
1,413,608.  Patented Apr. 25, 1922.
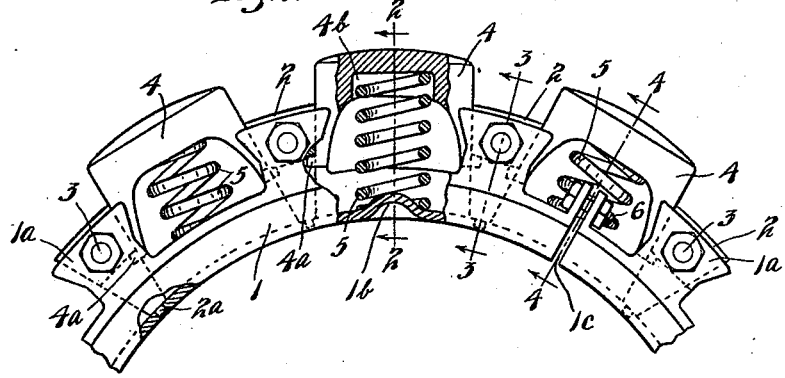
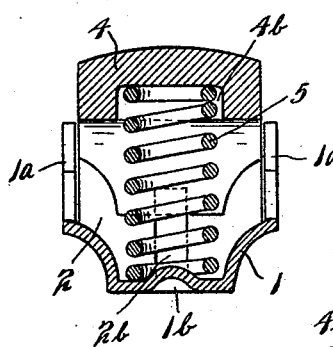
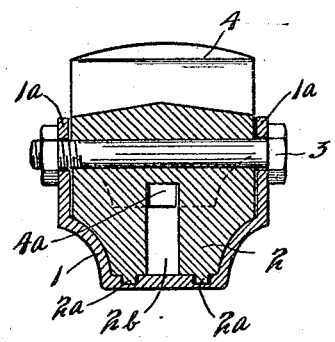
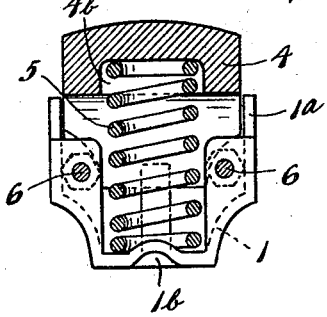
INVENTOR.
ELLERTH C. OVERBOE
BY HIS ATTORNEY.
James F. Williamson

UNITED STATES PATENT OFFICE.

ELLERTH C. OVERBOE, OF KENYON, MINNESOTA.

SPRING WHEEL.

1,413,608.    Specification of Letters Patent.    Patented Apr. 25, 1922.

Application filed January 6, 1922. Serial No. 527,304.

*To all whom it may concern:*

Be it known that I, ELLERTH C. OVERBOE, a citizen of the United States, residing at Kenyon, in the county of Goodhue and State of Minnesota, have invented certain new and useful Improvements in Spring Wheels; and I do hereby declare the following to be a full, clear, and exact description of the invention, such as will enable others skilled in the art to which it appertains to make and use the same.

This invention relates to a spring wheel of the type in which traction members in the form of blocks are yieldingly mounted in the wheel rim and project therefrom. The wheel is particularly designed for automobiles and especially such automobiles as are used in truck service.

It is an object of this invention to provide a spring wheel or cushion wheel having very few parts, which parts can be easily and inexpensively made and assembled.

It is a further object of the invention to construct the parts of the spring wheel so that the same will be firmly held in proper position during the movement thereof.

These and other objects and advantages of the invention will be fully set forth in the following description made in connection with the accompanying drawings in which like reference characters refer to the same parts throughout the different views, and in which—

Fig. 1 is a partial side view of the wheel in side elevation, certain parts being shown in section;

Fig. 2 is a vertical section taken on the line 2—2 of Fig. 1;

Fig. 3 is a radial section taken on the line 3—3 of Fig. 1; and

Fig. 4 is a radial section taken on the line 4—4 of Fig. 1.

Referring to the drawings, the wheel comprises a trough-shaped member 1, the bottom of which is substantially parallel with the axis of the wheel and the side portions of which flare outwardly therefrom. This rim is formed at its peripheral edges with radially projecting and circumferentially spaced flat lugs 1ª, the lugs on the two sides of the rim being arranged in alined pairs, the sides of the lugs adjacent the rim being parallel but flaring outwardly at their outer portions. Secured between each pair of lugs 1ª is a wedge shaped block 2, these blocks being secured in place by headed and nutted bolts 3 extending through alined holes in said lugs and through apertures in said blocks. The blocks 2 are formed at their inner portions to fit the flaring sides of the member 1 and said rim is provided with spaced depressions in which lugs or projections 2ª on the blocks are disposed. The blocks 2 are formed at each radial side thereof with slots 2ᵇ extending from the inner or bottom portion thereof to a point substantially in alinement with the end of the parallel side portions of lugs 1ª. Mounted to slide between and in contact with the blocks 2 are the hollow block members or shells 4 having their top or outer surfaces formed curved substantially concentric with the center of the wheel and having their end surfaces solid or continuous and in contact with the blocks 2. These members 4 have lugs 4ª projecting centrally from the bottom of their end surfaces, which lugs are adapted to be disposed to slide in the slots 2ᵇ in the blocks 2. The members 4 are cut away at the side portions, as clearly shown in Fig. 1 and are provided in their top portions with centrally disposed cylindrical recesses 4ᵇ. Coiled springs 5 are arranged with their top portions disposed in the recesses 4ᵇ and bear at their inner ends against the bottom of the rim member 1, said rim being formed with outwardly pressed cylindrical raised portions or bosses 1ᵇ over which the said springs are disposed and by which they are held in place. The member 1 will ordinarily be formed as a continuous rim split or divided, as shown at 1ᶜ, the same being provided at this point with upstanding lugs through which pass short headed and nutted bolts 6 for holding the ends of the rim securely in fixed relation and in contact with the wheel.

With the structure described it is seen that there are very few parts in applicant's device. As stated, the rim 1 is formed with the lugs 1ª integral therewith. The blocks 2 will, obviously, be held securely in position. As the wheel travels along the ground, the weight thereon will be sustained by the members 4 and these members will be yieldingly pressed in as they come in contact with the ground, the springs 5 yielding in this action. These springs will normally keep the members 4 pressed outwardly so that the lugs 4ª will be in contact with the top or outer portion of the slots 2ᵇ. The outer surface of the members 4 may, of course, be corrugated or provided with any suitable traction or friction device. A wheel constructed as described, operates very smoothly and when once assembled, will require very little attention for maintenance or repair.

It will, of course, be understood that various changes may be made in the form, details and proportions of the parts without departing from the scope of applicant's invention, which, generally stated, consists in the matter shown and described and set forth in the appended claims.

What is claimed is:

1. A spring wheel structure having in combination, a trough shaped rim having at each edge thereof radially projecting integral flat lugs, the lugs at the respective edges of said rim being arranged in alined pairs, a wedge-shaped block secured between the lugs of each of said pairs, said blocks having lugs engaged with said rim and having closed end slots in their radial sides extending from their inner edges, radially disposed shell members adapted to slide in contact with said blocks between the same and having lugs projecting from their end portions moving in said slots in the blocks, said shell members having closed ends and tops, and springs bearing at one end on the periphery of said rim and engaging the shell members beneath the top thereof whereby said shell members will be yieldingly projected outward.

2. A four-part spring wheel structure comprising a trough-shaped rim member having radially projecting flat lugs spaced at each peripheral edge thereof, the lugs at the respective edges of the rim being arranged in alined pairs, a solid block secured between the lugs of each of said pairs, a hollow block member disposed between each pair of said solid blocks having an arc-shaped top, and flat ends adapted to slide in contact with the sides of said solid blocks, and single springs engaging said rim and each of said hollow blocks underneath the top of the latter.

3. A spring wheel structure comprising a trough-shaped rim having radially projecting spaced flat lugs at each edge thereof, the lugs at the respective edges of the rim being arranged in alined pairs, a wedge-shaped block secured between the lugs of each of said pairs, and hollow block members arranged for sliding movement between said blocks having their side portions cut away, said hollow blocks each having a cylindrical recess centrally disposed in the inner top portion thereof, and a single coiled spring for each hollow block having one end disposed in said recess, and bearing at its other end upon said rim whereby the hollow blocks are yieldingly pressed outwardly.

4. A spring wheel structure comprising a trough-shaped rim having radially projecting circumferentially spaced integral lugs at each peripheral edge thereof, the lugs of the respective edges being arranged in alined pairs, blocks secured to said rim and disposed between said lugs, tread members disposed between said blocks and having outwardly limited sliding engagement therewith, and a spring for each tread member disposed between the same and the rim and normally pressing said member outwardly.

5. A spring wheel structure comprising a trough-shaped rim having radially projecting circumferentially spaced flat flaring lugs at each peripheral edge thereof, said rim having spaced recesses in its bottom, blocks secured between said lugs and having spaced projections at their inner portions disposed in the recesses in said rim, tread members arranged to slide between said blocks, means for limiting the outward movement of said tread members, and a single spring for each tread member bearing on the rim and pressing said tread member outwardly.

In testimony whereof I affix my signature.

ELLERTH C. OVERBOE.

Witnesses:
MINA LOKEN,
MYRTLE F. NORD.